Patented Nov. 16, 1937

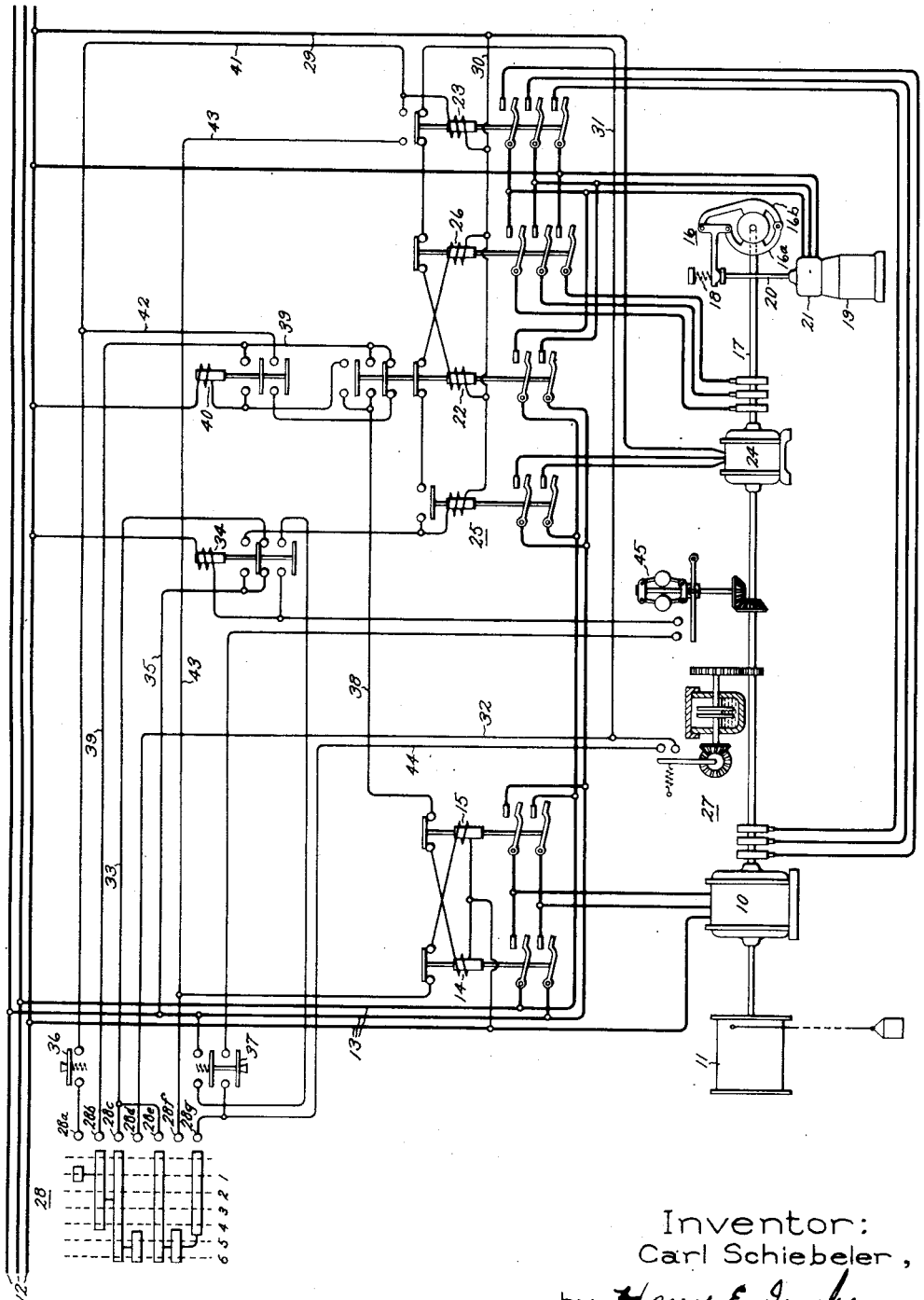

2,099,576

UNITED STATES PATENT OFFICE 2,099,576

CONTROL SYSTEM

Carl Schiebeler, Berlin-Charlottenburg, Germany, assignor to General Electric Company, a corporation of New York Application August 18, 1936, Serial No. 96,620
In Germany September 20, 1935

7 Claims. (Cl. 172—179)

This invention relates to control systems, more particularly to systems for controlling the operation of electric motors, and it has for an object the provision of a simple, reliable and improved system of this character.

More specifically, the invention relates to control systems for alternating current induction motors, driving hoists and the like, which are subjected at times to light non-overhauling loads, and a further object of the invention is the provision of means for controlling the motor to lower a light non-overhauling load at low speed.

Conditions encountered in actual practice also often require that an over-hauling load be lowered at low speed. For the purpose of lowering an over-hauling load, the master switch is usually designed to provide "plugging" operation or reverse current braking and is usually provided with a plurality of plugging positions on the lowering side. The plugging torque in the first braking position is usually of sufficient magnitude to lower full load at slow speed. At each successive position, the plugging torque is weakened by increasing the resistance interposed in the motor circuit and the size of the load that can be lowered at low speed is correspondingly decreased. The plugging resistance for each braking position is calculated for a definite size of load. If a greater load is applied, the lowering speed increases abruptly, and if a smaller load is applied, the plugging torque decreases the lowering speed to such an extent that the motor may even stop, reverse, and start hoisting the load. This, of course, is not permissible, and accordingly a still further object of this invention is the provision of means for lowering an over-hauling load at low speed by plugging the driving motor, i. e., reversing its power connections, or by means of mechanical braking if the plugging torque decreases the speed of the driving motor below a predetermined low speed.

In carrying the invention into effect in one form thereof, this is accomplished by transferring from reverse current braking to a combination of power lowering and mechanical braking action if the plugging reduces the lowering speed below a predetermined value. Means are provided for controlling the mechanical braking in dependence upon the speed of the driving motor. In one form, these means comprise an electrohydraulic operating mechanism, the motor of which is connected to the secondary winding of the hoist motor. As an alternative, the motor of the electro-hydraulic operating mechanism may be connected to another source of voltage having a frequency proportional to the speed of the hoisting motor, such for example as a frequency converter driven by the hoisting motor.

In illustrating the invention in one form thereof, it is shown as embodied in a control system for a motor utilized for driving hoists and the like. For a better and more complete understanding of this invention, reference should now be had to the following specification and to the accompanying drawing, the single figure of which is a simple diagrammatical representation of an embodiment of the invention. Referring now to the drawing, an electric motor 10 is mechanically connected to the winding drum 11 of a hoist or similar apparatus which under certain operating conditions may impose a light, non-overhauling load on the motor 10 and which under certain other operating conditions may impose an over-hauling load on the motor. The motor 10 is illustrated as an alternating current motor of the wound rotor induction type. Power is supplied to this motor from a suitable source represented by the three supply lines 12 to which the primary winding is arranged to be connected through conductors 13 by means of suitable reversing switching mechanism illustrated as a pair of electromagnetically operated contactors 14 and 15. When contactor 15 is closed, the motor 10 is energized for rotation in such a direction as to lower the load and when contactor 14 is closed, motor 10 is energized for rotation in the hoisting direction. The drum of a mechanical brake 16 is mounted on the motor shaft 17. Suitable means, illustrated as a spring 18 are provided for biasing the braking shoes 16a, 16b to braking position, and electro-hydraulic operating mechanism 19 is provided for releasing the brake shoes. This electro-hydraulic operating mechanism comprises a piston immersed within a cylinder containing oil or other suitable fluid and connected by means of a connecting rod 20 to the arm of the brake shoe actuating mechanism, and an impeller within the cylinder driven by an electric motor 21 for producing a liquid pressure against the piston of sufficient magnitude to release the brake shoes 16a, 16b against the bias of the spring 18.

A control relay 22 is provided for connecting the motor 21 of the hydraulic operating mechanism to the source 12 to effect release of the brake. Another control relay 23 is provided for connecting the motor 21 of the electro-hydraulic operating mechanism to the secondary windings of motor 10 to provide a regulated braking action proportional to the speed of motor 10.

Connected to the shaft 17 of motor 10 is a frequency changer 24. A control relay 25 is provided for connecting the primary winding of this frequency changer to the supply source 12 and an additional control relay 26 is provided for connecting the motor 21 of the electro-hydraulic operating mechanism to the secondary winding of the frequency changer under certain operating conditions.

A control switching device 27 serves to interrupt the plugging braking connections for the motor 10 and to reestablish the power driving connections therefor in the event that the plugging torque is sufficient to stop the motor and start it in the reverse direction. Under these conditions the switching device 27 also operates to disconnect the motor 21 of the electro-hydraulic operating mechanism from the source 12 and to connect it to the secondary winding of motor 10. A multi-position master switch 28 is provided for controlling the starting, braking and stopping of motor 10. This type of master switch is usually provided with a number of segments and fingers for controlling the amount of resistance in the secondary circuit of the motor. Such segments and fingers have been omitted from the drawing in the interest of simplicity. This type of master switches is also usually provided with a plurality of positions for controlling the hoisting operation of the motor. In the drawing, only that half of the master switch for controlling the lowering operation is shown, since this is sufficient for illustrating the invention.

With the foregoing understanding of the apparatus and its organization in the completed system, the operation of the system itself will readily be understood from the following detailed description. The master switch 28 is illustrated in its central or off position and the apparatus is, therefore, illustrated in its normal deenergized condition with the brake shoes 16a, 16b set against the brake drum by means of the spring 18. Positions 1, 2, 3, and 4 of the master switch are braking positions and positions 5 and 6 are power lowering positions. If the master switch is thrown quickly from the central or off position to one of the power lowering positions, for example to position 5, the relay contactor 22 is energized. Its energizing circuit is traced from the lower supply line 12 by conductors 29 and 30, through the operating coil of relay 22, normally closed interlocks of relays 26 and 23, conductors 31 and 32, fingers 28c and 28d (bridged by segments of the master switch in the fifth position thereof), conductor 33, intermediate normally closed interlocks of relay 34 and thence by conductor 35 to the upper side of the supply source 12. The relay contactor 22 responds to energization and closes its main contacts to connect the motor 21 of the electro-hydraulic operating mechanism to the supply source 12. The electro-hydraulic operating mechanism 19 responds to rotation of its driving motor 21 and produces a thrust on the connecting rod 20 which releases the brake shoes 16a, 16b against the bias of the spring 18. Simultaneously, the lowering contactor 15 is energized. The circuit is traced from the upper side of the supply source 12 through fingers 28e and 28f of the master switch, normally closed interlocks of hoisting contactor 14, operating coil of lowering contactor 15 and thence to the lower side of the supply source 12. Contactor 15 closes its contacts and connects the primary winding of the motor 10 to the supply source for rotation in the lowering direction. It will be noted that in passing through positions 1–4, the master switch does not energize any of the control apparatus, provided that the push buttons 36 and 37 are not closed. In the sixth position of the controller, the secondary contactors (not shown) are all closed automatically in correct sequence to short-circuit the secondary resistance and bring the motor 10 up to speed. This is conventional and well understood by persons skilled in the art and is, therefore, not illustrated in the drawing.

As the motor comes up to speed, in the lowering direction, the contacts of relay 27 are closed.

An alternating current induction motor of the wound rotor type connected to lower a load, can only exert a braking torque at super-synchronous speed. A light load insufficient to overcome the friction and losses in the drive will be lowered by power taken from the source 12 by motor 10.

If it is desired to lower the load at low speed, the master switch is moved from points 5 or 6 toward the right to one of the braking positions 1, 2, 3, or 4. As the master switch is moved from the fifth to the fourth position, the energizing circuit for the lowering contactor 15 is interrupted and an energizing circuit for hoisting contactor 14 is completed. The energizing circuit for the hoisting contactor is traced from the lower supply line 12 through left-hand conductor 13, operating coil of contactor 14, normally closed interlocks of lowering contactor 15 now deenergized, conductor 38, intermediate interlocks of relay 22, conductor 39, fingers 28b and 28c bridged by segments of the master switch. The finger 28c is connected to the upper side of the supply source 12 as previously traced. The hoisting contactor 14 closes in response to energization and connects the motor 10 to the line for rotation in a direction opposite to that in which it is rotating. This is referred to as plugging the motor and this causes the motor to produce a powerful braking torque. When the master switch was moved from the fifth to the fourth position, the energizing circuit of the relay 22 was not interrupted, but was maintained through the contacts of the switching device 27. These contacts remain closed as long as the speed of the motor 10 is greater than some predetermined low value.

In the fourth position of the master switch, an energizing circuit is established for the control relay 40, which circuit is traced from the lower supply line 12 to the operating coil of relay 40, upper and intermediate interlocks of relay 22, conductor 39 and fingers 28b and 28c bridged by the segments of the master switch. The relay 40 responds to close both its upper and lower contacts. In closing its upper contacts, relay 40 completes a holding circuit independent of the interlock contacts of relay 22.

If the plugging torque is too great and stalls the motor, relay 27 opens its contacts and thereby interrupts the energizing circuit of the relay 22, which in turn opens its main contacts to disconnect the motor 21 of the electro-hydraulic operating apparatus from the source 12. Owing to its holding circuit, the relay 40 remains energized and closed.

Relay 22 in opening completes an energizing circuit for contactor 23. This circuit is traced from the lower supply line 12 through conductors 29 and 30, operating coil of relay 23, conductors 41 and 42, lower contacts of relay 40, intermediate interlock contacts of relay 22, and thence by conductor 39 to finger 28b and through the segments of the master switch to the power finger 28c. Contactor 23 closes in response to energization and connects the motor 21 of the electro-hydraulic operating apparatus to the slip rings of the driving motor 10. Simultaneously relay 22 in opening interrupts the energizing circuit of the hoisting contactor 14 previously traced through the intermediate interlocks of relay 22. Hoisting contactor 14 opens in response to deenergization and its normally closed interlocks complete an energizing circuit for the lowering contactor 15. This circuit is traced from the power finger 28c of the master switch through the segments of the master switch, finger 28b, conductor 39, intermediate interlock of relay 22, lower contacts of relay 40, thence by conductors 42 and 41 and upper contacts of relay 23, conductor 43, interlock of hoisting contactor 14, operating coil of lowering contactor 15 and thence to the lower side of the supply source 12. As result lowering contactor 15 is reclosed and the hoisting motor 10 is now connected to the source for rotation in the lowering direction. Since the motor 21 of the electro-hydraulic operator is connected to the slip rings of the motor 10, the speed of motor 21 is a function of the voltage and frequency of the secondary winding of the motor 10. The electro-hydraulic operating mechanism 19 produces a thrust proportional to the speed of the motor 21 and therefore this thrust which opposes the bias of the brake-applying spring 18 is also a function of the voltage and frequency of the secondary winding of the motor 10. If the speed of the motor 10 increases, the speed of the motor 21 decreases and thereby decreases the thrust which opposes the bias of the spring 18. This results of course in increasing the braking force applied to the drum of the brake. The increased braking force tends to decrease the speed of the motor 10 and this causes the speed of the motor 21 to increase and to reduce the braking force on the drum. At some intermediate speed, a balance is established and the motor 10 continues to lower the load at that intermediate speed.

If the master switch is moved to any of the other braking positions 1, 2, or 3, this balance is upset because the amount of the resistance in the secondary circuit of the motor 10 is changed. A new balance is established at some new speed. Thus, the load can be lowered under complete control at speeds below synchronous speed by a combination of motor torque, load torque and friction braking.

If it is desired to lower a light non-overhauling load at low speed, the master switch 28 is moved to position 1 in the first instance instead of being moved to positions 5 or 6. The push button 36 is operated to its closed position and this completes an energizing circuit for contactor 23. The circuit is readily traced from the lower side of the supply source 12 through the operating coil of the contactor 23, conductor 41, contact of push button 36, fingers 28a and through the segments of the master switch to the power finger 28c. Contactor 23 closes in response to energization and connects the motor 21 of the electro-hydraulic operating mechanism to the slip rings of the motor 10. Contactor 23 in closing also closes its upper interlocks to complete an energizing circuit for the lowering contactor 15, which circuit is traced from the lower side of the supply source 12 to conductor 13, operating coil of lowering contactor 15, normally closed interlocks of hoisting contactor 14, conductor 43, upper interlock of relay 23 and thence by conductor 41, contacts of push button switch 36, finger 28 and segments of the master switch to the power finger 28c. Lowering contactor 15 closes its contacts and connects motor 10 to the source 12 for rotation in the lowering direction. In the first position of the master switch, there is a high resistance in the secondary circuit of the motor 10. The maximum resistance in commercial installations is insufficient to reduce the speed of the motor because even with a high resistance in the rotor circuit, a wound rotor induction motor will run at high speed if the load is light. It is, therefore, necessary to apply a false load to the motor 10 and this is accomplished by means of the mechanical brake and the electro-hydraulic operating mechanism therefor. As the speed of the motor 10 increases, the speed of the motor 21 decreases and thereby increases the braking force applied to the drum of the mechanical brake. This tends to decrease the speed of the motor 10 and to increase the speed of the motor 21 and thereby relieve the braking force. At some low speed of the motor 10 a balance is established and the motor 10 continues to lower its light load at low speed.

If the load on the motor 10 should be heavier than anticipated, and a plugging braking torque appears to be necessary to reduce the lowering speed, the master switch 28 is operated from its first position to any one of the plugging braking positions 2, 3, or 4. As the master switch is moved from its first to its second position, the energizing circuit for contactor 23 is interrupted and the contactor opens its main contact to disconnect the motor 21 from the slip rings of the motor 10 and also opens its upper interlock contacts through which the energizing circuit of the lowering contactor 15 was traced. This interrupts the energizing circuit of the lowering contactor 15 and causes this contactor to open its main contacts and disconnect the motor 10 from the source 12. Contactor 23 in opening, closes its lower interlock contacts to complete an energizing circuit for relay 22. This circuit is traced from the lower side of the supply source 12 through the operating coil of relay 22, interlock contacts of contactors 26 and 23, conductor 31, contacts of device 27 (closed when the motor 10 is rotating), conductor 44, fingers 28g and 28e bridged by segments of the master switch and thence to the upper side of the supply source 12. Relay 22 in responding to energization closes its main contacts to connect the motor 21 of the electro-hydraulic operating mechanism to the source 12 and also closes its upper intermediate interlock contacts to complete an energizing circuit for the hoisting contactor 14. This circuit extends from the lower side of the supply source 12 through the operating coil of contactor 14, interlock of lowering contactor 15, conductor 38, upper intermediate interlock contacts of relay 22 (now energized), and thence by conductor 39, finger 28b and segments of the master switch 28 to the power finger 28c. The electro-hydraulic operating mechanism completely releases the brake in response to energization of its driving motor 21 and the hoisting contactor 14 in closing connects the motor 10 to the source 12 for rotation in a direction opposite to that in which it is rotating and thus produces a powerful braking force. When relay 22 closed, it completed an energizing circuit for the relay 40 that is traced in the foregoing description. In response, relay 40 closed its contacts. If the plugging torque should become too severe and stall the motor 10, switching device 27 opens its contact and deenergizes and opens the control relay 22. Relay 22 in opening deenergizes and opens the hoist contactor 14 and relay 22 in opening also recompletes the energizing circuit for contactor 23. Contactor 23 in response to energization recloses its main contacts to connect the motor 21 of the electro-hydraulic operating mechanism to the slip rings of the motor 10 and also completes a previously traced energizing circuit for the lowering contactor 15. The motor 10 then continues to lower the load in response to a combination of the force of the load, the lowering torque of the motor 10, and the braking force of the friction brake 16.

If a high limit of speed is not to be exceeded when lowering with the master switch on one of the plugging braking positions 2, 3, or 4 of the master switch, the push button 37 and the speed governor 45 are utilized. If the push button 37 is closed and the speed governor 45 closes its contacts on account of excessive speed, an energizing circuit is completed for the relay 34 that extends from the lower side of the supply source 12 through the operating coil of the relay 34 and contacts of the speed governor switch 45, thence through contacts of push button 37, segments 28g and 28e of the master switch bridged by the segments thereof and thence through intermediate interlock contacts of relay 34 to the upper side of the supply source. Relay 34 responds to energization by closing its upper contacts, opening its intermediate contacts and closing its lower contacts. Relay 34 in opening its intermediate contacts interrupts the energizing circuit of the relay 22 which in response to deenergization opens its main contacts and disconnects the motor 21 from the supply source 12. Relay 34 in closing its lower contacts completes a holding circuit traced from the lower side of the supply source through its operating coil, lower contacts, upper contacts of push button switch 37 to the upper side of the source 12. In closing its upper contacts, relay 34 establishes an energizing circuit for contactor 25 that extends from the lower side of the source 12 through conductor 29, operating coil of contactor 25, upper contacts of relay 34 to the upper side of the supply source 12. Relay 25 responds to energization and closes its main contacts to connect the primary winding of the frequency changer 24 to the supply source 12. In the closed position of contactor 25, the upper interlock completes an energizing circuit for contactor 26 that is traced from the lower side of the supply source 12 through conductor 29, operating coil of contactor 26, lower interlock of relay 22, interlock of contactor 25, upper contact of relay 34, thence by conductor 35 to the upper side of the supply source 12. Contactor 26 closes in response to energization and connects the motor 21 of the electro-hydraulic operating mechanism to the secondary winding of the frequency changer 24. The frequency converter is so designed that at a speed of 70% to 80% of full load speed, equilibrium exists between the driving power and the brake release power. All loads can, therefore, be lowered at this speed.

Although in accordance with the provisions of the patent statutes, this invention is described as embodied in concrete form, it will be understood that the apparatus and connections shown and described are merely illustrative and that the invention is not limited thereto since alterations and modifications will readily suggest themselves to persons skilled in the art without departing from the spirit of this invention or from the scope of the annexed claims.

What I claim as new and desire to secure by Letters Patent of the United States, is:

1. A motor control system comprising a source of voltage, an electric motor supplied from said source, a mechanical brake for said motor biased to braking position, an electro-hydraulic brake operating mechanism energized from said source for releasing said brake, and means responsive to an operating condition of said motor for disconnecting said electro-hydraulic brake operating mechanism from said source and energizing it from a voltage dependent upon the speed of said motor thereby to produce a braking force varying in accordance with the speed of said motor.

2. A motor control system comprising in combination a source of voltage, an induction motor supplied from said source, a mechanical brake for said motor, means biasing said brake to braking position, an electro-hydraulic brake operating mechanism, a master switch for connecting said motor to said source and for connecting said electro-hydraulic operating mechanism to said source to release said brake, and means responsive to the speed of said motor for disconnecting said operating mechanism from said source and connecting said operating mechanism to the secondary winding of said motor thereby to cause said brake to apply a braking force dependent upon the speed of said motor.

3. A motor control system comprising in combination, a source of supply, an electric motor supplied from said source, a mechanical brake for said motor, means biasing said brake to braking position, an electro-hydraulic operating mechanism for said brake, means for connecting said motor to said source and for connecting said operating mechanism to said source to release said brake, means for establishing reverse power braking connections for said motor, and means responsive to decreased speed of said motor for disconnecting said electro-hydraulic operating mechanism from said source and for energizing said mechanism with a voltage dependent upon the speed of said motor thereby to provide a graduated braking force dependent upon the speed of said motor.

4. A control system comprising an induction motor, a source of supply therefor, a mechanical brake for said motor, means biasing said brake to braking position, an electro-hydraulic operating mechanism for said brake, means for establishing power connections between said motor and said source and for connecting said electro-hydraulic operating mechanism to said source thereby to release said brake, means for establishing reverse power braking connections for said motor, means responsive to decreased speed of said motor for interrupting said reverse power braking connections and reestablishing said power connections and for disconnecting said electro-hydraulic braking mechanism from said source and connecting it to the secondary winding of said motor thereby to provide a braking force dependent upon the speed of said motor.

5. A motor control system for an induction motor subject to overhauling loads comprising a source of power for said motor, a mechanical brake for said motor biased to braking position, electro-hydraulic operating means for said brake, a master switch for said motor having an off position, a power position and a reverse power braking position, means responsive to operation of said master switch from said off position to said power position for connecting said motor to said source for motoring operation and for connecting said electro-hydraulic operating mechanism to said source to release said brake, means responsive to operation of said master switch from said power position to said braking position for establishing reverse power braking connections for said motor, and a device responsive to stopping of said motor for reestablishing said power connections for said motor and for disconnecting said electro-hydraulic operating mechanism from said source and connecting it to the secondary winding of said motor to provide a graduated braking force and thereby to control the overhauling speed of said load.

6. A control system for a wound rotor induction motor driving a hoist and the like subject to an overhauling load, a source of supply, a mechanical brake for said motor, an electro-hydraulic operating mechanism for said brake, a master switch for controlling the lowering operation of said motor, said switch having an off position, a power lowering position and a reverse power braking position between said off and lowering positions, means responsive to operation of said switching device from said off position to said power lowering position for connecting said motor to said source for lowering said load under power and connecting said electro-hydraulic operating mechanism to said source to release said brake, means responsive to operation of said master switch to said braking position for establishing reverse current braking connections for said motor, and a speed switch responsive to stopping of said motor for reestablishing said power lowering connections for said motor and connecting said electro-hydraulic operating mechanism to the secondary winding of said motor thereby to provide a graduated braking force dependent upon the speed of said motor to effect lowering of said overhauling load at substantially constant speed.

7. A control system for wound rotor induction motors driving hoists and the like comprising a source of supply, a mechanical brake for said motor, electro-hydraulic operating mechanism for said brake, a master switch for controlling said motor, said master switch having an off position and a braking position adjacent said off position, an electromagnetic switching device for connecting said electro-hydraulic mechanism to the secondary winding of said motor, said switching device being normally inactive when said master switch is in said braking position, a second switching device for actuating said electromagnetic switching device when said master switch is in said braking position to connect said electro-hydraulic mechanism to the secondary winding of said motor thereby to provide a braking force to produce a false load on said motor to provide for lowering a non-overhauling load at low speed, and means responsive to actuation of said electromagnetic switching device for connecting said motor to said source for lowering operation.

CARL SCHIEBELER.